(12) United States Patent
Cooper (10) Patent No.: US 10,051,848 B2
(45) Date of Patent: Aug. 21, 2018

(54) FISH STRIKING DEVICE

(71) Applicant: Paul Alan Cooper, Mount Cotton (AU)

(72) Inventor: Paul Alan Cooper, Mount Cotton (AU)

(*) Notice: Subject to any disclaimer, the term of this patent is extended or adjusted under 35 U.S.C. 154(b) by 274 days.

(21) Appl. No.: 14/896,894

(22) PCT Filed: Jun. 30, 2014

(86) PCT No.: PCT/AU2014/000675
§ 371 (c)(1),
(2) Date: Dec. 8, 2015

(87) PCT Pub. No.: WO2015/000015
PCT Pub. Date: Jan. 8, 2015

(65) Prior Publication Data
US 2016/0174538 A1    Jun. 23, 2016

(30) Foreign Application Priority Data
Jul. 3, 2013  (AU) ................................ 2013902642

(51) Int. Cl.
*A01K 91/10* (2006.01)
*A01K 97/11* (2006.01)
*A01K 91/04* (2006.01)

(52) U.S. Cl.
CPC .............. *A01K 91/10* (2013.01); *A01K 91/04* (2013.01); *A01K 97/11* (2013.01)

(58) Field of Classification Search
CPC ......... A01K 91/04; A01K 91/10; A01K 97/11
USPC .......................................................... 43/15
See application file for complete search history.

(56) References Cited

U.S. PATENT DOCUMENTS

| | | | |
|---|---|---|---|
| 2,552,516 A | 5/1951 | Camp et al. | |
| 2,590,721 A | 3/1952 | Muth | |
| 2,640,290 A | 6/1953 | Ames et al. | |
| 2,705,383 A * | 4/1955 | Hatcher | A01K 91/10 43/16 |
| 2,797,516 A * | 7/1957 | Suddarth | A01K 91/10 43/15 |
| 2,851,811 A | 9/1958 | Mantell | |
| 3,078,609 A * | 2/1963 | Efird | A01K 91/10 43/15 |
| 3,453,765 A * | 7/1969 | Gibbons | A01K 97/11 43/15 |
| 3,879,884 A * | 4/1975 | Tucker, Sr. | A01K 91/08 43/42.72 |
| 4,212,125 A * | 7/1980 | Kim | A01K 87/00 43/16 |
| 4,382,346 A * | 5/1983 | Gardner | A01K 91/10 43/15 |
| 4,750,286 A * | 6/1988 | Gray | A01K 97/11 43/15 |
| 4,944,106 A | 7/1990 | Wu et al. | |

(Continued)

*Primary Examiner* — Marc Burgess
(74) *Attorney, Agent, or Firm* — Kirton McConkie; Evan R. Witt (57) ABSTRACT

A fish striking device for attachment to a fishing rod and line having a channel body containing tension means one end of which is retained at one end of the channel and the other end of which is fixed to a trigger mechanism slidably mounted on the channel which trigger mechanism is releaseably retained on the channel and engages the line of the fishing rod such that when a fish pulls on the line the trigger mechanism is released and the line is pulled taught by the released tension means.

15 Claims, 6 Drawing Sheets

(56) References Cited

U.S. PATENT DOCUMENTS

| | | | | |
|---|---|---|---|---|
| 5,199,206 A | * | 4/1993 | Richardson | A01K 87/00 43/18.1 R |
| 6,012,247 A | * | 1/2000 | Kinsey | A01K 91/10 43/15 |
| 7,152,360 B1 | * | 12/2006 | Neufeld | A01K 91/10 43/15 |

* cited by examiner

FIG 12

FISH STRIKING DEVICE

FIELD OF THE INVENTION

This invention relates to a fish striking device which is useful for setting a hook in the mouth of a fish.

BACKGROUND OF THE INVENTION

The objective of successful fishing is to attract a fish to bait or lure placed upon a hook. When the fish strikes the bait and envelopes the hook in its mouth it is extremely desirable to set the hook in the mouth of the fish to cause the point of the hook to penetrate the flesh of the fish through a barb located on a shaft of the hook and snag the fish so that the fish may be drawn out of the water for retrieval.

However this objective is not easy to achieve because the hook may be released from the mouth of the fish if the fish takes only a few tentative tugs at the hook. This problem is particularly troublesome when fishing on a boat when two or more fishing rods are located in a suitable position on the boat and the fisherman must take particular attention to the situation if a fish has not firmly caught the hook in its mouth.

It is also known that fish are apt to bite or strike infrequently and the fisherman usually supports his fishing rod on a bank with the fishing line in the water and strolls around or sits down while watching the line for evidence of a strike. At the instant the fish rises to the bait as will be known by a jerking on the line the fisherman will make a dive to the rod in an endeavor to make the strike. It frequently happens however that by the time he has grasped the fishing rod the fish has got away on account of the instant manipulation that his required to make a strike.

GB 1448023 refers to a fish striking device adapted for attachment to a fishing rod having a fishing line which comprises a piston housed in a tubular housing or sleeve and there is further provided a helical spring in the tubular housing which is retained in a compressed state by the piston which has a catch associated therewith that has a hook for engaging the fishing line which retains the spring in the compressed state and thus the fishing line is maintained in a non-release position. However when a fish bites on the fishing line the catch is activated to release the fishing line which enables the piston to move to one end of the tubular housing. There is also provided a second hook mounted to the housing which also engages the fishing line in the non-release position but which is pivotally mounted to the housing and releases the fishing line when the piston moves to the release position.

DE 3148372 refers to a fishing rod having a base which contains a spring which after a fish bites the bait attached to a fishing line activates movement of the spring and a rod support and rod device moves from a starting position wherein the rod support and rod device are restrained by the spring to a release position whereby the caught fish moves out of the water together with the fishing line.

DE 102004015979 refers to a fishing rod holder having a square section tube having a pair of rod supports mounted thereto. A fishing line is held by a clamp and passes forwardly through a clip. The clip is mounted on a spring loaded lever system which releases the line when a fish bites and then catches the line again to strike.

U.S. Pat. No. 6,012,247 refers to an automatic fishhook setting device wherein a lever may be engaged by the tug of a fish strike on a fishing line to release the tension of a spring. The spring will then snap the line to set the fishhook in the fish. US Patent Publications 2007289195 and 2004016171 refer to similar subject matter wherein a spring biases a shaft to a non-release position. The shaft is released when a fish tugs on a lure or bait.

However a problem of the prior art discussed above was that such prior art was complicated in structure or was not user friendly. Thus for example U.S. Pat. No. 6,012,247 and US Patent Publications 2007289195 and 2004016171 were intended to function as an intermediate component between the fishing rod and fishhook and this did not appeal to many fishermen.

GB 1448023 as well as DE 3148372 and DE 102004015979 were also complicated in structure and this meant manufacture was relatively expensive. DE 3148372 was a specialised fishing rod and this could not be attached to a conventional fishing rod.

OBJECT OF THE INVENTION

It is therefore an object of the invention to provide a fish striking device which is attachable to a conventional fishing rod and which is efficient in operation or at least to provide an alternative to prior art devices.

SUMMARY OF THE INVENTION

The fish striking device of the invention has an elongate member having an internal passage and a carriage for movement in the internal passage from a non-release position to a release position upon the influence of a rubber spring to which the carriage is attached at an adjacent end thereof within the internal passage. The carriage has a trigger which is pivotally mounted to a body of the carriage to which a fishing line is attached. Upon pivotal movement of the trigger from the non-release position the carriage is returned with said internal passageway to a release position wherein the carriage moves in the internal passageway under the influence of the rubber spring to thereby pull the fishing line taught and thus effect a fish strike.

The elongated member may be a tube but is preferably a channel which is desirably provided with a lateral extension or rib.

The carriage may include a lower body part movable in the channel and an upper body part movable in an elongate slot which defines an open mouth of the channel.

The body of the carriage may be provided with a pair of stops wherein one stop retains the trigger in the non-release position and the other stop retains the trigger in the release position.

The trigger may also be provided with an auxiliary spring biasing movement of the trigger to the non-release position.

The body of the carriage may be provided with an up-stand spring attached to or integral with the upper part which is biased to the release catch which is suitably located above the non-release stop which is attached to the elongated member.

The rubber spring that engages within the internal passage or channel may have crimp ends or clamps wherein one end is retained over a spigot end located at one end of the channel and the other end may be retained over a spigot located in the body of the carriage suitably located in the lower body part.

The elongate member or channel may also be provided with suitable attachment means to a conventional fishing rod such as a pair or plurality of clips or clamps or alternatively by the use of fasteners.

According to an alternate embodiment of the invention a fish striking device for attachment to a fishing rod and line comprises a double back to back channel body containing tension means one end of which is fixed at one end of the lower channel and passes through the lower channel around a pulley into the upper channel and the other end of which is fixed to a trigger mechanism slidably mounted at the opposite end of the upper channel which trigger mechanism is releaseably retained on the barrel and engages the line of the fishing rod such that when a fish pulls on the line the trigger mechanism is released and the line is pulled taught by the released tension means.

Preferably the trigger mechanism has a latch which hooks over a stop located in the upper channel and is released by a lever which pivots adjacent the latch and engages the fishing line which loops from a first eyelet of the rod back around a pulley pivotted on the free end of the lever and returns through a second eyelet of the rod.

Preferably the trigger mechanism has a spring loaded screw to adjust the sliding friction of the mechanism on the upper channel.

Preferably the tension means is a rubber spring.

Preferably fastening loops are located at opposite ends of the channel body for attaching the device on the fishing rod.

Preferably the tension means is retained in the lower channel by an adjustment screw the turning of which adjusts the tension in the tension means.

Alternatively the device is adapted for attachment to a fishing rod holder assembly.

DESCRIPTION OF THE PREFERRED EMBODIMENT OF THE INVENTION

Reference may be made to a preferred embodiment of the invention shown in the attached drawings wherein.

Figure 1:
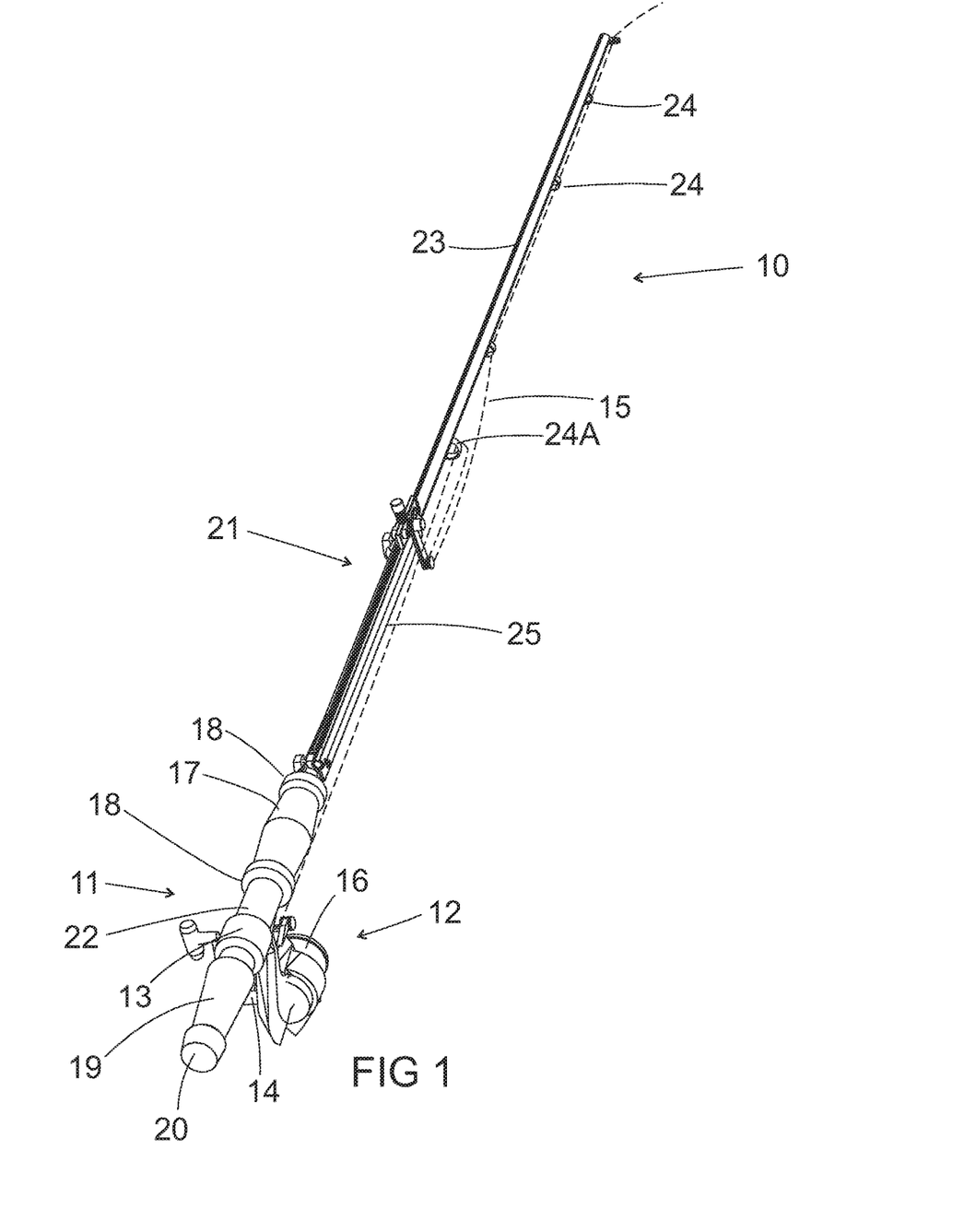
FIG. 1 is a perspective view of a fishing rod having attached thereto the fish striking device of the invention.

Reference is made in FIG. 1 to a fishing rod 10 which has a handle assembly 11 with a reel 12 which is attached to handle 11 by screw clamp 13 and which has a winder 14 which winds a fishing line 15 onto spool 16 which is part of reel 12. Handle assembly 11 has a grip 17 separated by flanges 18. Handle assembly 11 may have an additional grip 19 adjacent end protrusion 20. Screw clamp 13 is movable along shaft 22.

Fishing rod 10 also includes rod shank 23 having eyelets 24 attached thereto for supporting fishing line 15 in the conventional fashion. It will be appreciated that rod shank 23 can flex relative to handle assembly 11 depending upon the load which is imparted to rod shank 23 which depends on the weight of the fish being caught. There is also provided a fish striking device 21 attached to rod shank 23. In FIG. 1 striking device 21 has an elongate channel assembly 25 which is attached to rod shank 23 adjacent handle assembly 11 and also adjacent a first eyelet 24A.

Figure 2:
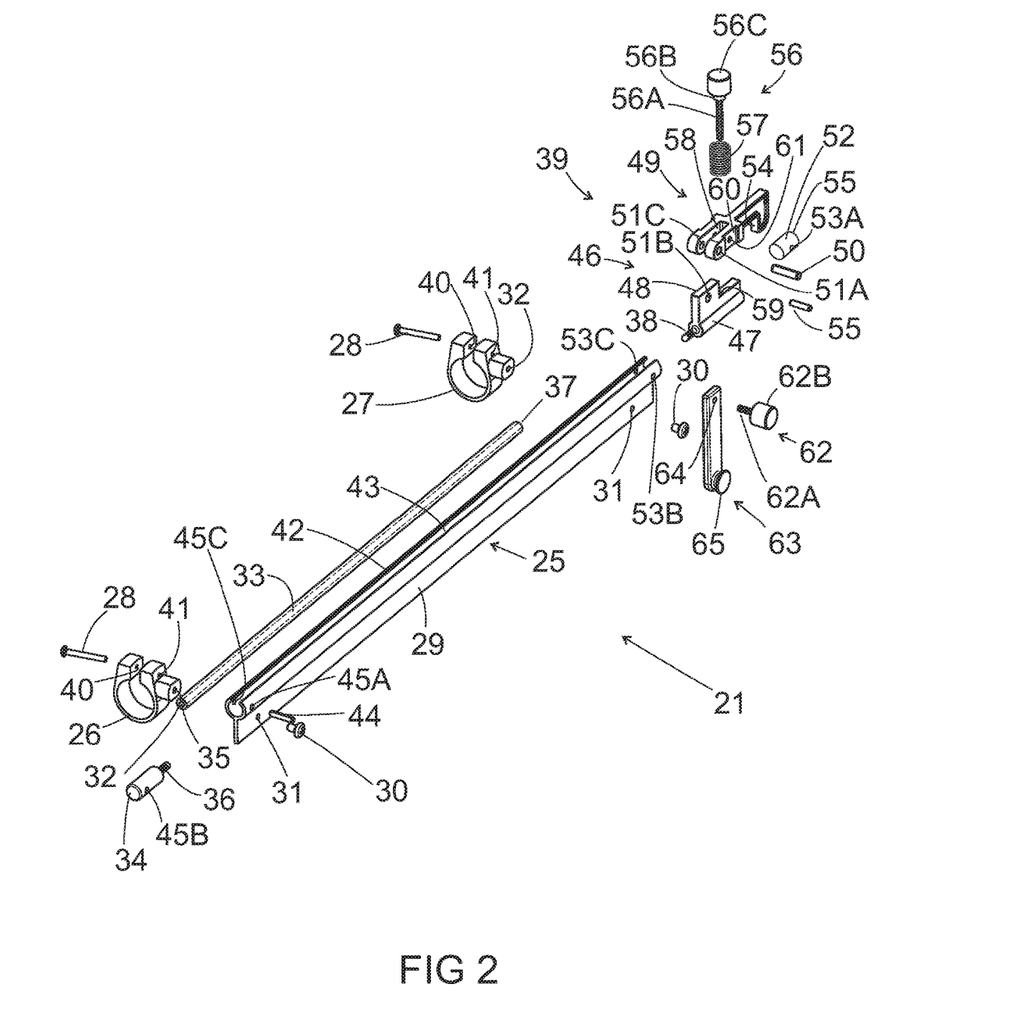
FIG. 2 is an exploded perspective view of the striking device shown in FIG. 1.

In FIG. 2 striking device 21 is illustrated in greater detail and includes end clamps 26 and 27 for attachment to rod shank 23. Each of clamps 26 and 27 have a screw 28 which extends through aligned apertures 40 and 41 for tightening clamps 26 and 27 when required to attach elongate channel assembly 25 to rod shank 23. In particular each of clamps 26 and 27 are attached to elongate lateral extension 29 of channel assembly 25 by screws 30 which extend through aligned apertures 31 and 32. There is also shown rubber spring 33 which operates under tension and is compressed or collapsed in its release position described hereinafter.

In its loaded position as shown in FIG. 1 rubber spring 33 is in its extended or taut state. Rubber spring 33 has end stop or spring retainer 34. Rubber spring 33 also has hollow cavity 35 and is anchored to end stop 34 at spigot end 36. The other end of rubber spring 33 also has hollow cavity 37 and is anchored to spigot 38 of carriage 39 which functions as the other spring retainer. A steel crimp ring may be used to clamp the tubular ends of the rubber spring 33 (not shown). There is also provided dowel pin 44 for mounting of end stop 34 to channel part 42 of channel assembly 25 through aligned attachment apertures 45A, 45B and 45C. Channel part 42 is also provided with an elongate slot 43.

Carriage 39 has a body part 46 having round component 47 which travels in channel 42 and upper extension 48 which travels in elongate slot 43. There is also provided a rotatable part 49 pivotally or rotationally mounted to component 46 by a pivot pin 50 which extends through aligned apertures 51A, 51B & 51C. There is also provided end stop 52 which has aperture 53A which is mounted into end channel 42 by pin 55 which extends through aligned apertures 53A, 53B & 53C. Rotatable part 49 has a catch face 54 that mates with face 55 of end stop 52. This arrangement is illustrated in greater detail in FIG. 6.

There is also provided screw pin 56 which has threaded pin 56A, neck 56B and Stop or head 56C which engages with coil spring 57 whereby threaded pin 56A passes through slot 58 of rotational part 49 and engages screw threaded hole 59 of body part 46. This arrangement is illustrated in greater detail in FIGS. 6 & 7. There is also provided screw pin 62 which has threaded pin 62A and Stop or head 62B. There is also provided lever 63 which has hole 64 and a fixed headed pulley 65. Screw pin 62 extends through aligned apertures 64 on lever 63 and threaded hole 61 of rotational part 49. The main body of lever 63 engages slot 60 of rotational part 49.

Figures 3, 4, 5:
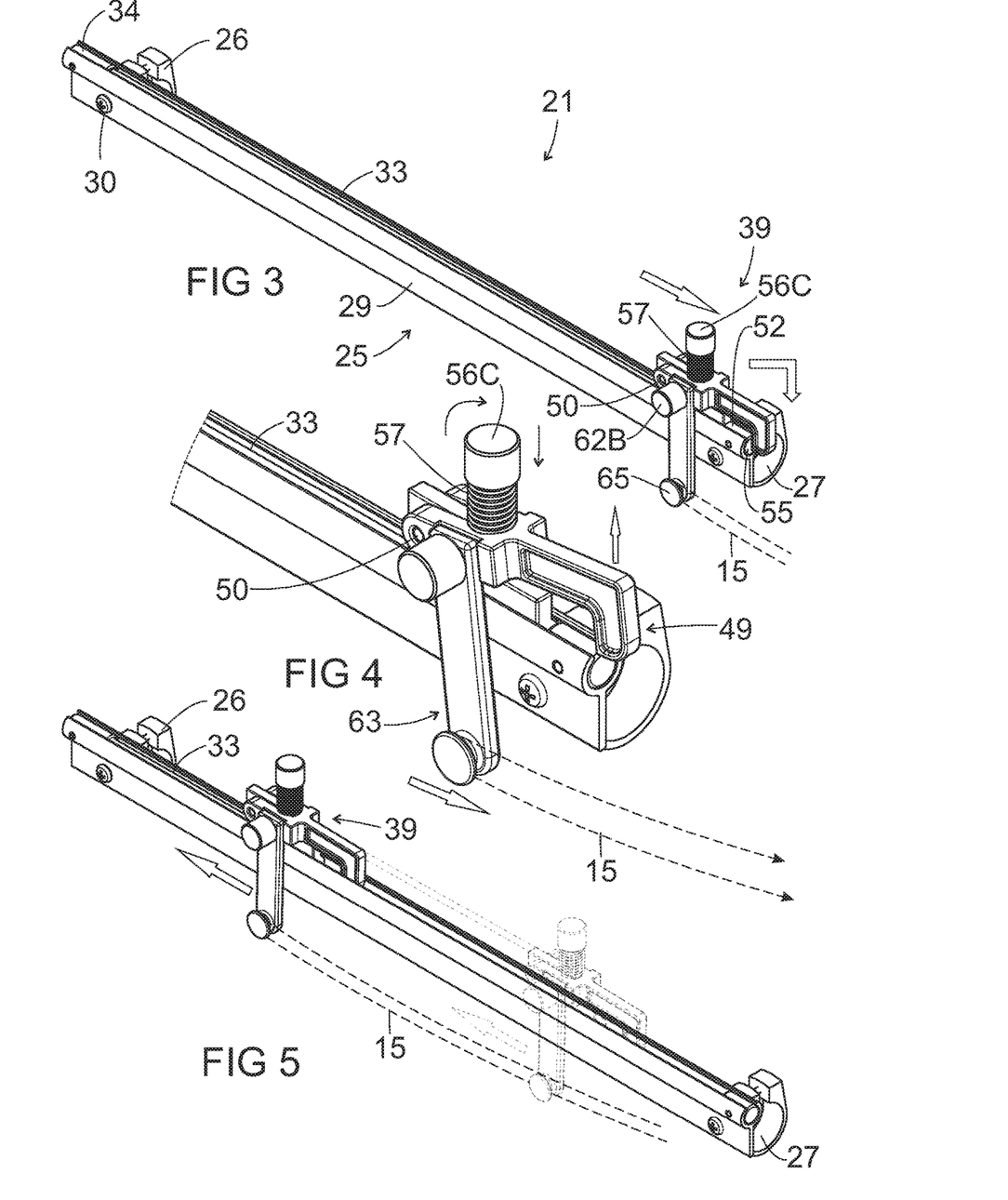
FIGS. 3-5 are perspective views of an assembled striking device of the invention.

In FIG. 3 there are shown assembled view of carriage 39 mounted in channel 43 and end stops 34 and 52 also mounted in channel 43. In FIGS. 4-5 there is shown a method of operation of striking device 21 and it will be noted in FIG. 4 that fishing line 15 has now become taut due to pressure or a force being extended on fishing line 15 by a fish pulling on a hook (not shown) connected to fishing line 15. This means that lever 63 will pivot on a pivot axis defined pin 50 and against a bias exerted by spring 57 that is biased towards the normal or non-operational position shown in FIG. 6.

Figure 6:
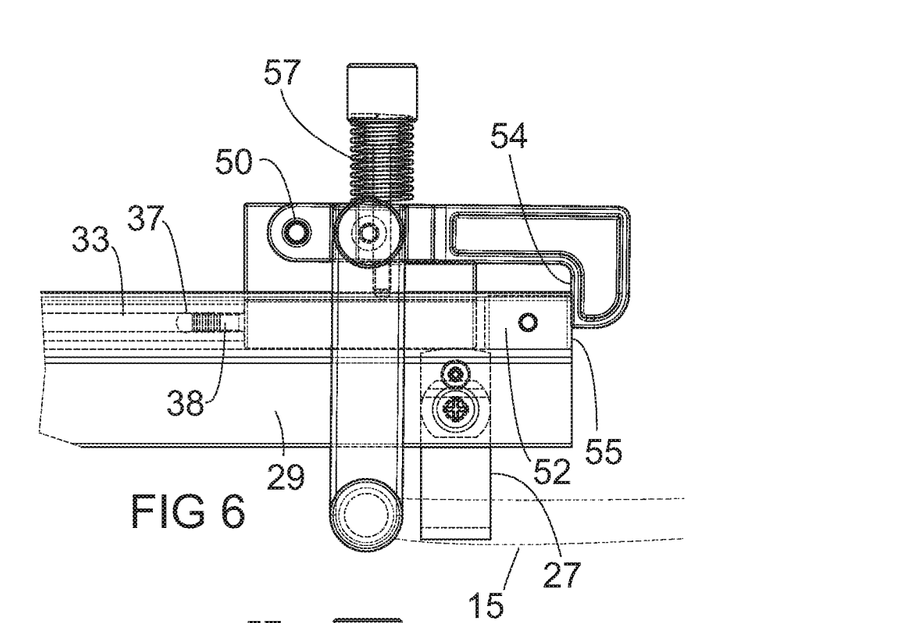
FIG. 6 is a side view of the trigger of the striking device shown in FIGS. 3-5 when in the loaded position.

Both spring ends 57 engage with rotational part 49 and head 56C. Bias of the spring may be increased by rotating head 56C clockwise to compress spring 57 to increase resistance against a fish pulling on a hook. As lever 63 commences to pivot because the pulling force of the fish is greater than the bias exerted by spring 57, this in turn causes pivotal lift of rotating component 49 whereby catch face 54 dis-engages with face 55 of stop 52 placing the carriage assembly 39 into the release position.

In FIG. 5 it will be noted that carriage assembly 39 has now moved rapidly from its loaded position (dotted lines) to the released position due to the bias of rubber spring 33. In FIG. 6 the carriage assembly 39 is shown in the loaded position with line 15 under minimal load from the weighted line and hook assembly. Rubber spring 33 is shown in its extended bias position and rubber spring end 37 fits over spigot 38. A small crimped ring (not shown) can be used to retain spring end 37 onto spigot 38. Rotatable part 49 shows catch face 54 mating with face 55 of end stop 52.

Figure 7:
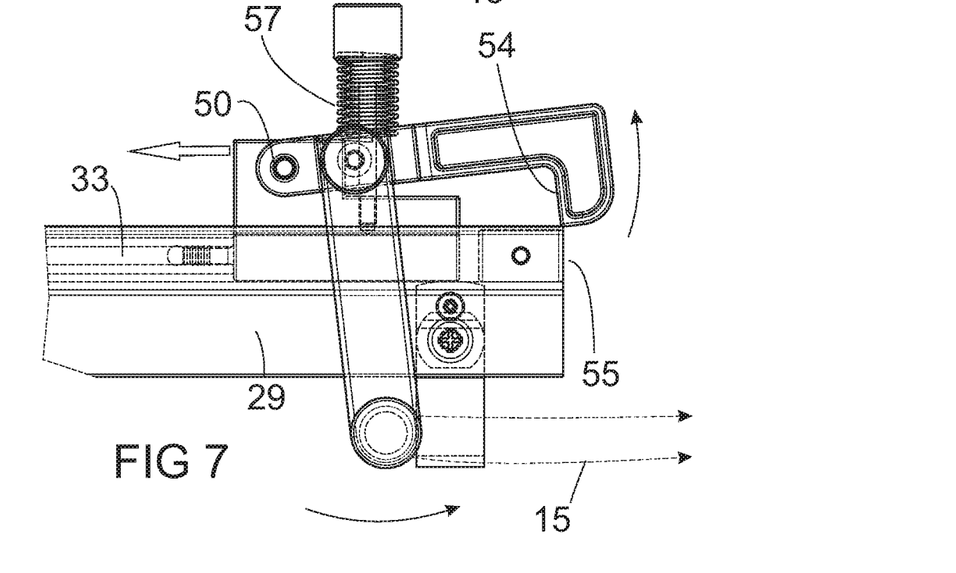
FIG. 7 is a similar view to FIG. 6 showing the trigger in the release or operational position.

FIG. 7 shows carriage assembly 39 in the release position with line 15 under load from the fish pulling on the hook and overcoming the bias on rotatable part 49 from spring 57. Catch face 54 of rotatable part 49 has cleared mating face 55 of end stop 52. The bias of rubber spring 33 creates the striking force thus pulling line 15 impulsively and setting the hook in the fish's mouth.

Figure 8:
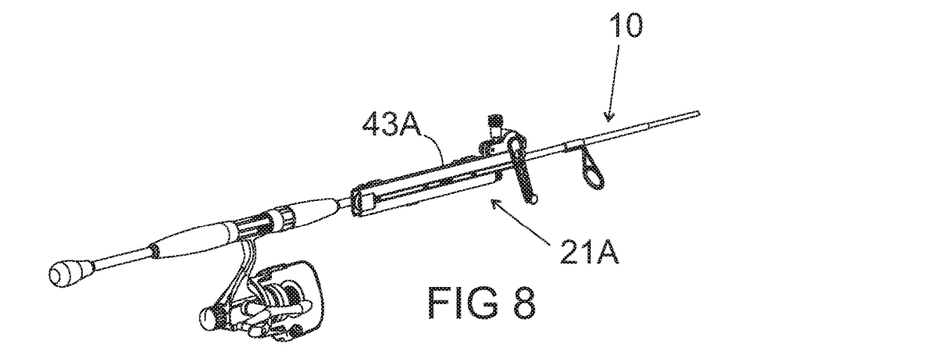
FIG. 8 is a perspective view of a fishing rod having attached thereto alternate embodiment of the fish striking device.
Figure 9:
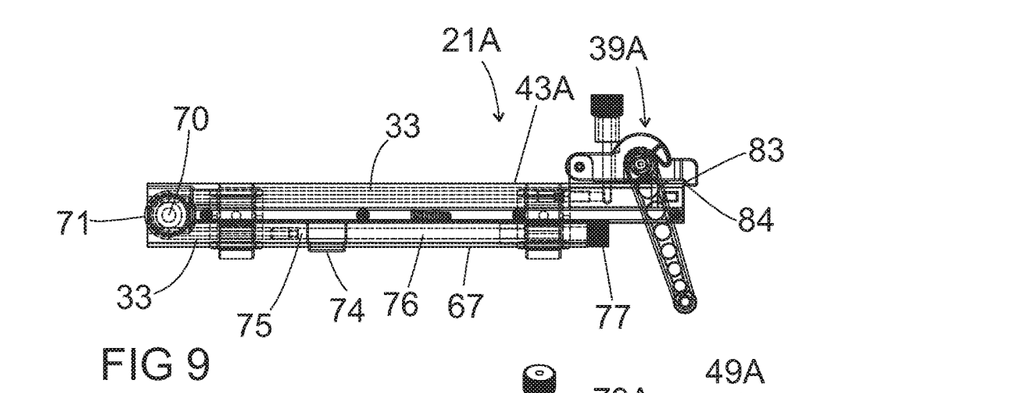
FIG. 9 is a side view of the alternate embodiment of FIG. 8.
Figure 10:
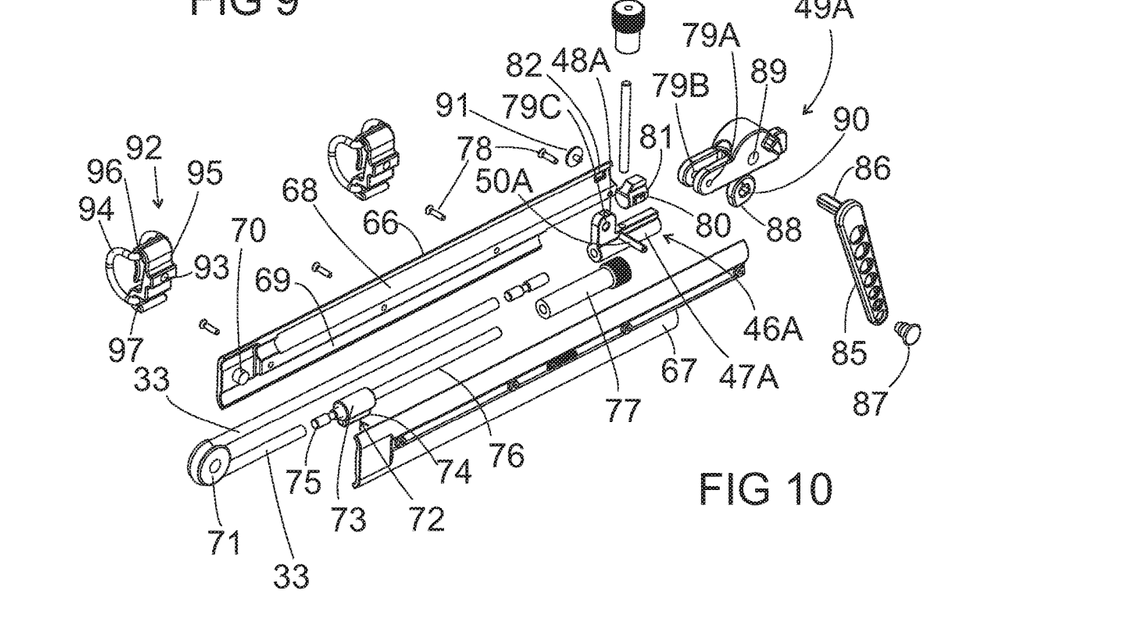
FIG. 10 is an exploded perspective of the alternate embodiment of FIG. 8.

In FIG. 8 alternate embodiment of striking device 21A is shown fitted to fishing rod 10 and in FIG. 9-10 device 21A is shown with mating halves 66 and 67 which have circular channels 68 and 69 and spigot 70 onto which pulley 71 sits allowing rubber spring 33 to pass around pulley to adjustable end stop 72. This configuration of shorter mating halves 66 and 67 makes this embodiment more compact than the first embodiment.

Adjustable stop 72 has a main body 73 with guide protrusion 74 and mount protrusion 75 to which rubber spring 33 attaches and screw 76 to which tension adjuster screw 77 engages. Turning tension screw 77 clockwise brings adjustable stop 72 closer to tension screw 77, stretching rubber spring 33 and therefor applying greater spring tension. Mating halves 66 and 67 are held together by screws 78. Carriage 39A has a body part 46A having round component 47A which travels in circular channel 68 of mating parts 66 and 67 and upper extension 48A which travels in elongate slot 43A. There is also provided a rotatable part 49A pivotally or rotationally mounted to component 46A by a pivot pin 50A which extends through aligned apertures 79A, 79B & 79C. There is also provided end stop 80 which has protrusion 81 which is mounted into indent 82 in circular channel. Rotatable part 49A has a catch face 83 that mates with face 84 of end stop 80.

There is also provided lever 85 which has drive shaft 86 and a fixed headed pulley 87. There is also provided cam 88. Drive shaft 86 extends through aligned apertures 89 on rotatable part 49A and cam aperture 90 that sits with the cavity of rotational part 49A. Screw pin 91 engages open end of drive shaft retaining this assembly. There is also provided clip assembly 92 screw fit to mating half 66 via aperture 93 and has a rubber band 94 fitted to main body 95 within recess 96. Rubber band 94 passes around rod shank 23 and clips into recess 97.

Figure 11:
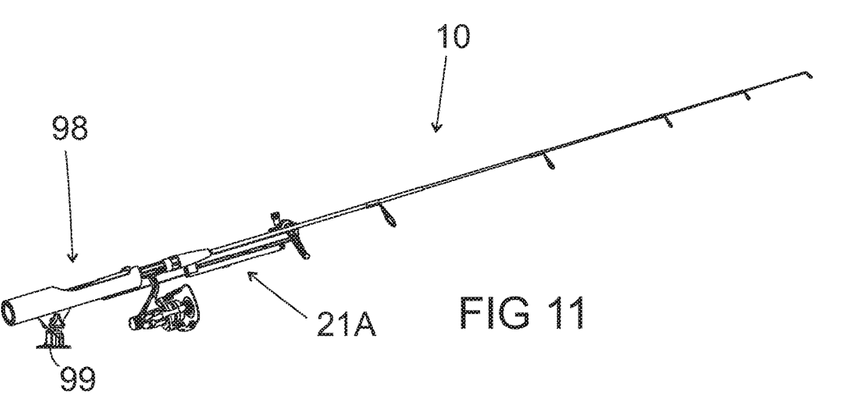
FIG. 11 is a perspective view of the alternate embodiment fitted to a rod holder assembly.
Figure 12:
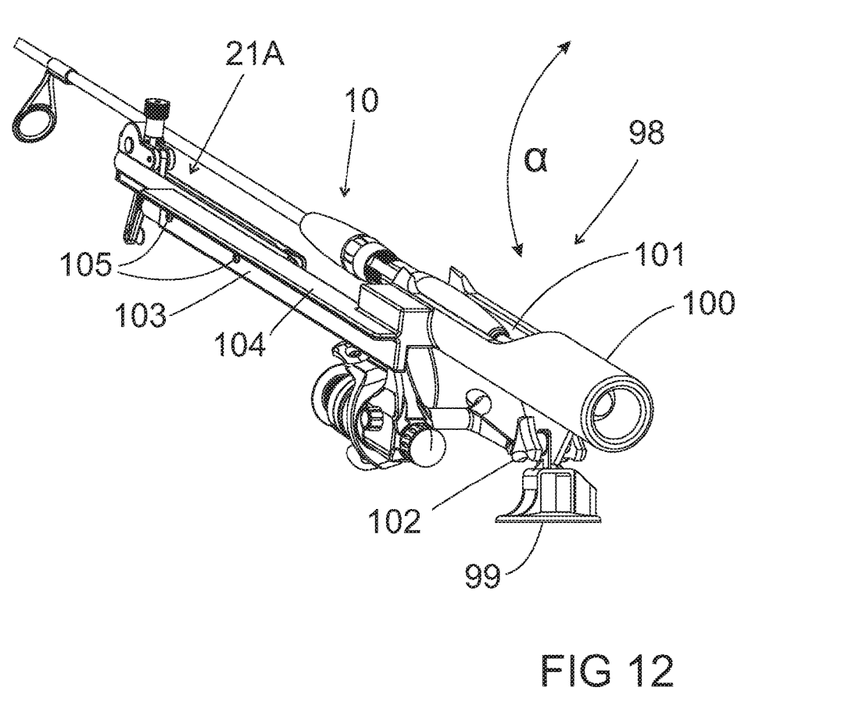
FIG. 12 is a close up perspective view of the alternate embodiment fitted to the rod holder assembly.

In FIG. 11-12 alternate embodiment of striker 21A is shown fitted to rod holder assembly 98 which has base mount 99 for attachment to a boat. Receiving tube 100 has cut away 101 to take rod 10. Pivot screw 102 to change angle 'α' and extension member 103 with stiffening rib 104 and mount holes 105 onto which alternate embodiment is attached. In this configuration the rod 10 can be removed and used normally or replaced with an alternate rod (not shown).

VARIATIONS

It will be realized that the foregoing has been given by way of illustrative example only and that all other modifications and variations as would be apparent to persons skilled in the art are deemed to fall within the broad scope and ambit of the invention as herein set forth. Throughout the description and claims of this specification the words "comprise" and variations of that word such as "comprises" and "comprising" are not intended to exclude other additives components integers or steps.

The invention claimed is:

1. A fish striking device configured for use with a fishing rod having a plurality of eyelets and fishing line, the fish striking device comprising:
   a first channel containing tension means;
   a trigger mechanism slidably mounted on the first channel, the trigger mechanism comprising:
      a latch having a free end which hooks over a stop located in the first channel and one end which pivots about a pivot point;
      a lever having one end connected to the latch and a free end, the lever being connected to the latch in a manner such that rotating the lever about the pivot point causes the latch to pivot and release the free end of the latch from the stop; and
      a pulley at the free end of the lever,
   wherein the fishing line is configured to loop from a first eyelet of the fishing rod back around the pulley at the free end of the lever and return through a second eyelet of the rod,
   wherein one end of the tension means is fixed to the trigger mechanism configured such that when a fish pulls on the fishing line, the fishing line looped around the pulley rotates the lever and releases the latch from the stop, such that the released tension means slides the trigger mechanism along the first channel and the line is pulled taught as the pulley moves with the trigger mechanism.

2. The device of claim 1 in which the trigger mechanism has a spring loaded screw to adjust a pivot force against the latch of the trigger mechanism.

3. The device of claim 1 in which the tension means is a rubber spring.

4. The device of claim 1 in which clamps are located at opposite ends of the first channel for attaching the device to the fishing rod.

5. The device of claim 1, further comprising a second channel, wherein the first channel and the second channel are configured as a back to back double channel body containing the tension means, wherein the end of the tension means fixed to the trigger mechanism is disposed in the first channel and an opposite end of the tension means is disposed in the second channel, wherein the tension means passes through the second channel around a pulley into the first channel.

6. The device of claim 5 in which the trigger mechanism has a spring loaded screw to adjust a pivot force against the latch of the trigger mechanism.

7. The device of claim 5 in which the tension means is a rubber spring.

8. The device of claim 5 in which fastening loops are located at opposite ends of the first or second channel for attaching the device to the fishing rod.

9. The device of claim 5 in which the tension means is retained in the second channel by an adjustment screw, the turning of which adjusts a tension in the tension means.

10. A fishing rod holder device, comprising a fish striking device according to claim 5.

11. A fishing rod holder device, comprising a fish striking device according to claim 1.

12. A fish striking device configured for use with a fishing rod having plurality of eyelets and fishing line, the fish striking device comprising:
- a moveable pulley having an engaged position and a released position, wherein the fishing line loops from a first eyelet of the fishing rod back around the moveable pulley and returns through a second eyelet of the rod, such that movement of the pulley a distance X in a direction away from the first eyelet from the engaged position to the released position, causes the fishing line to move through the second eyelet a distance 2X;
- tension means connected to the moveable pulley to bias the moveable pulley in the direction away from the first eyelet; and
- a trigger mechanism that engages the fishing line through the moveable pulley, the trigger mechanism comprising a lever and a rotatable part, the lever having one end connected to the rotatable part and a free end to which the moveable pulley is attached, the rotatable part having a catch face which mates with a stop to maintain the moveable pulley in the engaged position, wherein the lever and rotatable part pivot about a pivot point, the trigger mechanism being configured such that when a fish pulls on the fishing line, the fishing line looped around the moveable pulley causes the lever and rotatable part to pivot about the pivot point and release the catch face from the stop, such that the trigger mechanism and the moveable pulley move from the engaged position to the released position.

13. The device of claim 12 in which the trigger mechanism comprises a spring loaded screw to adjust a force against the rotatable part of the trigger mechanism.

14. The device of claim 12 in which the tension means is a rubber spring.

15. The device of claim 12 further comprising clamps configured to attach the device to a fishing rod.

* * * * *